United States Patent [19]
Weseloh et al.

[11] 4,292,721
[45] Oct. 6, 1981

[54] CRIMPING DEVICE FOR USE IN ASSEMBLING AN OVERTRAVEL SPRING ASSEMBLY FOR SLACK ADJUSTER

[75] Inventors: Roger J. Weseloh, South Holland; Wajih Kanjo, Midlothian; Syed Karim, Sauk Village, all of Ill.

[73] Assignee: American Standard Inc., Chicago, Ill.

[21] Appl. No.: 142,569

[22] Filed: Apr. 21, 1980

[51] Int. Cl.³ .............................................. B23P 11/00
[52] U.S. Cl. .................................................. 29/243.52
[58] Field of Search ................. 29/243.52, 243.5, 252; 72/402

[56] References Cited

U.S. PATENT DOCUMENTS

| | | | |
|---|---|---|---|
| 2,689,595 | 9/1954 | Belada | 29/243.52 |
| 3,631,579 | 1/1972 | Leach | 29/243.52 |
| 3,938,239 | 2/1976 | Lauth | 29/243.52 |
| 4,035,901 | 7/1977 | Lux et al. | 29/243.5 |

Primary Examiner—James L. Jones, Jr.
Attorney, Agent, or Firm—R. S. Visk

[57] ABSTRACT

Apparatus for circumferentially crimping the annular opposite ends of a cylindrical overtravel spring housing used in a slack adjuster and for maintaining the overtravel spring assembly in assembled relation and an overtravel spring therein in a compressed state. The apparatus includes a three-jaw lathe-type power chuck fixed to a support frame vertically opposite a power cylinder supported on another portion of the frame. The overtravel spring assembly is placed on a post member, fixed concentrically in the chuck, and held fast by the power cylinder when pressurized. With the spring assembly secured in the apparatus, a plurality of crimping blades carried on the jaws of the chuck are actuated to crimp a first annular end of the spring assembly housing, then removing the spring assembly and turning it over in the apparatus to crimp the other end of the housing, thereby securing the spring assembly in assembled relation.

8 Claims, 15 Drawing Figures

CRIMPING DEVICE FOR USE IN ASSEMBLING AN OVERTRAVEL SPRING ASSEMBLY FOR SLACK ADJUSTER

BACKGROUND OF THE INVENTION

The old method of assembling and retaining an overtravel caged spring for a slack adjuster in assembled relation relied on a threaded assembly which required machining of the threads and welding of the assembly once assembled. Such methods are costly.

SUMMARY OF THE INVENTION

The object of the present invention is to provide an apparatus by which an overtravel caged spring for a slack adjuster may be more simply and less costly assembled.

Briefly, the apparatus embodying the invention comprises a support frame including a table-like horizontal portion on which a multi-jaw lathe-type power chuck is mounted with a center post provided thereon. The power chuck has mounted thereon a crimping blade holder carrying a plurality of equiangularly spaced radially movable crimping blades. The overtravel spring assembly is centered axially on the post and rests in a crimping position on a base fixed to the chuck and mounting the crimping blades. A power cylinder, axially aligned with the post on the power chuck, is fixed on an upper portion of the frame and has a press assembly axially secured thereto which is lowered and engages the upper end of the spring assembly for holding it in position when the crimping blades are operated by the power chuck to crimp the lower end of the spring assembly.

DESCRIPTION AND OPERATION

Figure 1:
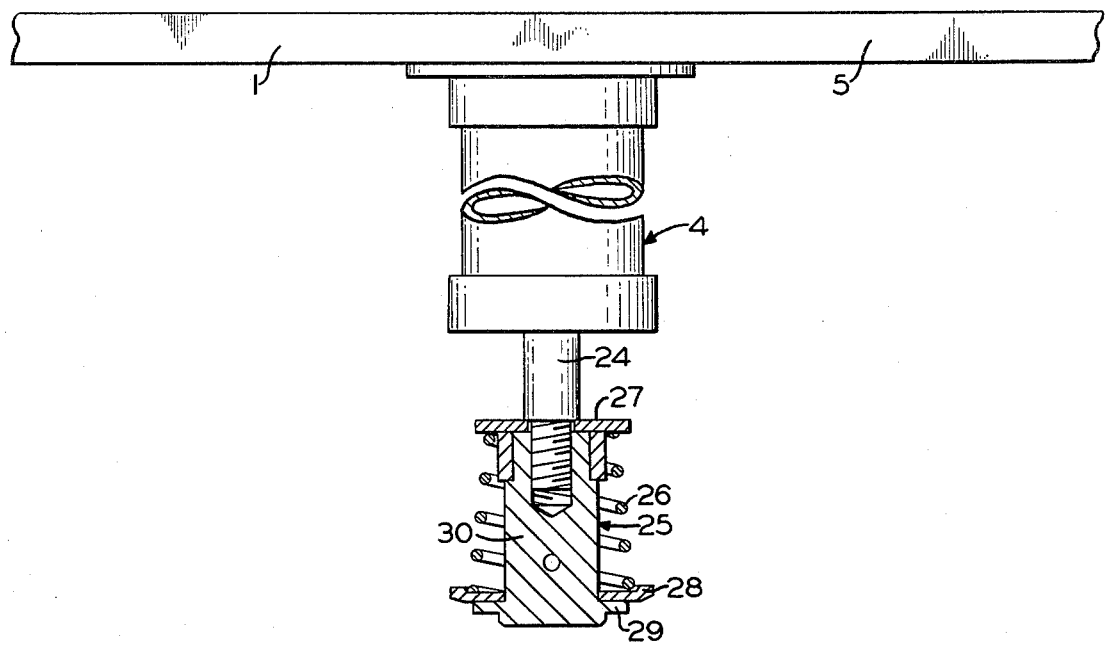
FIG. 1 is a generally schematic view, partly in section and partly in outline, of the crimping apparatus embodying the invention.
Figure 1:
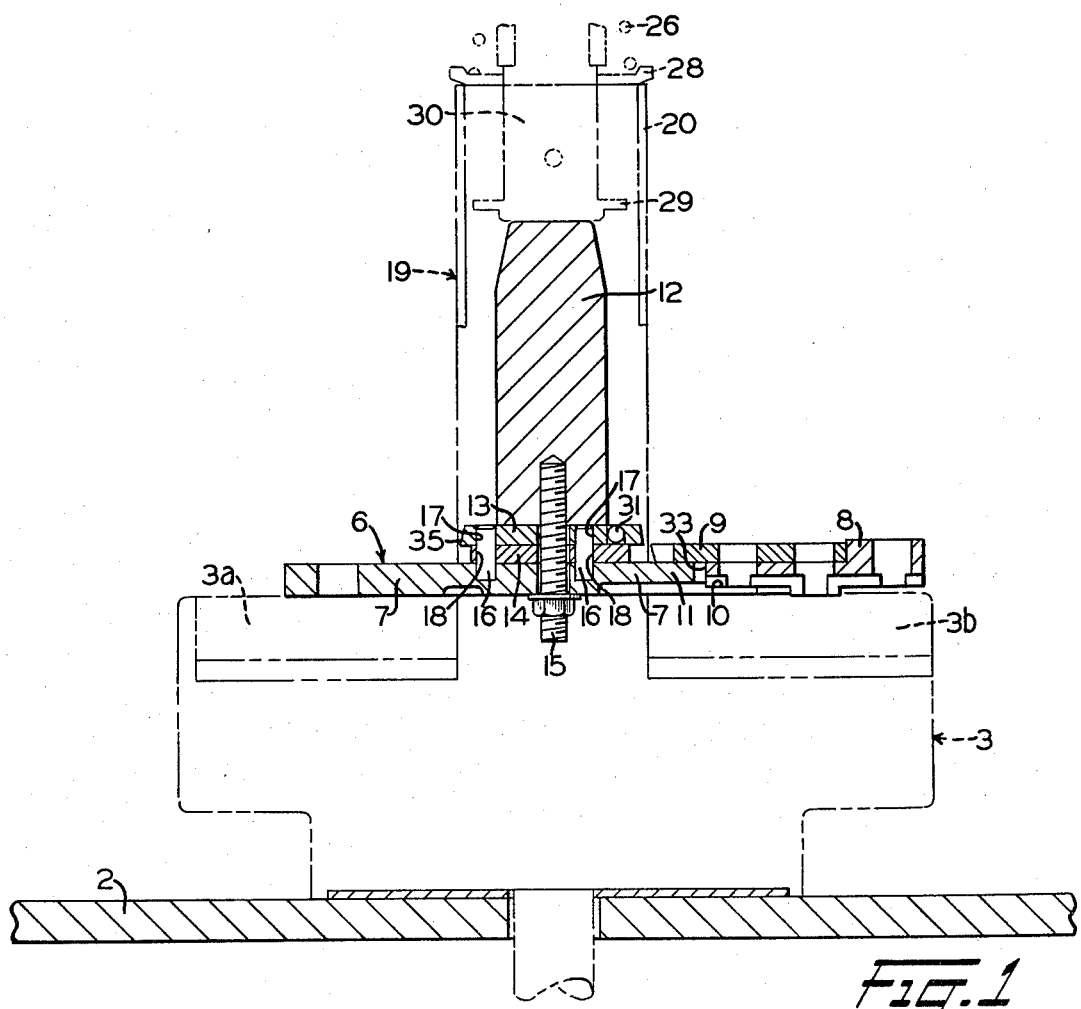
Figure 2:
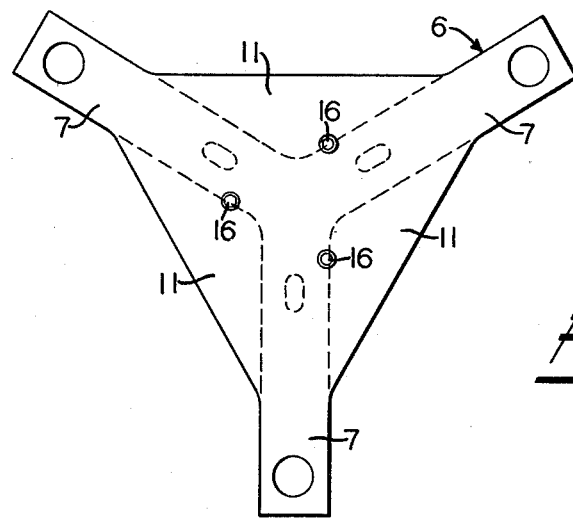
FIGS. 2 and 2A are horizontal and elevational views, respectively, of a base portion of the apparatus.
Figure 2A:
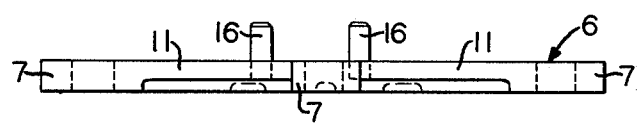
Figure 3A:
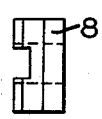
FIGS. 3 and 3A–3B are horizontal and elevational views, respectively, partly in section, of a blade holder portion of the apparatus.
Figure 3:
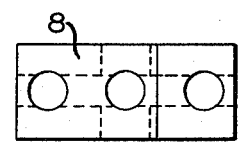
Figure 3B:
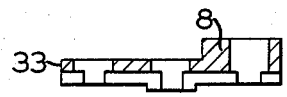
Figure 4:
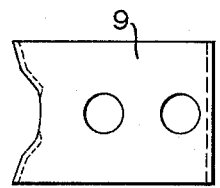
FIGS. 4 and 4A are horizontal and elevational views, respectively, partly in section, of a crimping blade.
Figure 5:
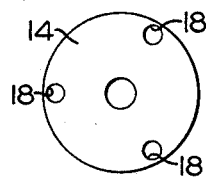
FIGS. 5 and 5A are horizontal and elevational views, respectively, partly in section, of a spacer member.

As shown in FIG. 1 of the drawings, a crimping apparatus embodying the invention comprises a support frame 1 (only a portion of which is shown) having a horizontal table portion 2 on which a lathe-type, multi-jawed power chuck 3 having three jaws, for example, two of which, 3a and 3b are represented by broken outline, is vertically fixed. Vertically opposite to and axially aligned with power chuck 3, is a power cylinder device 4 secured to an upper portion 5 of support frame 1.

A spider-like base member 6 having a plurality, such as three, for example, of equiangularly spaced legs 7 is bolted to the face of power chuck 3, as shown in FIG. 1 (bolts not shown). Each of legs 7 has radially slidably mounted thereon a blade holder 8 and a crimping blade 9 (only one of each being shown in FIG. 1) both of which are connected to each other so as to move radially as a unit by being bolted to the respective jaws of the chuck and movable therewith by bolts (not shown) projecting through elongated slots 10 formed in each leg of the blade holder. Inward radial movement of blade holders 8 and crimping blades 9 and, therefore, the depth of the crimp, is limited by abutment of the inner ends of said blade holders with respective webs 11 formed between legs 7 of base member 6.

Base member 6 concentrically supports a vertically disposed post 12, a platen member 13, and a spacer member 14, the latter being axially disposed between said base member and said platen member, all of which are concentrically secured to the chuck by a stud 15. Spacer 14, platen 13, and post 12 are arranged to allow a limited amount of vertical axial movement, such as 1/16", for example, to relieve vertical pressure after the crimping action. Post 12, platen 13, and spacer 14 are retained against radial and rotational displacement by dowels 16 secured in base 6 and extending vertically upwardly through aligned openings 17 and 18 formed in said platen and spacer members, respectively.

Figure 7:
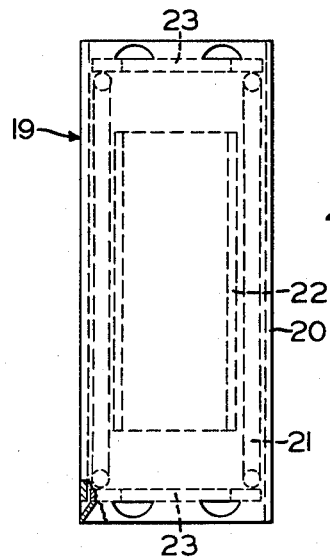
FIGS. 7 and 7A are elevational and end views, respectively, in outline, of an overtravel spring assembly.
Figure 8:
FIG. 8 is a side view, in outline, of a washer element.
Figure 7A:
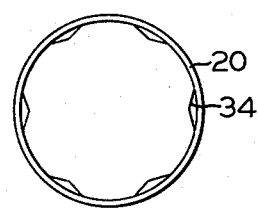

An overtravel spring assembly 19, shown in detail in FIGS. 7 and 7A, is shown in FIG. 1 in broken outline in a crimping position resting on base member 6. As shown in FIGS. 7 and 7A, the overtravel spring assembly 19, after having been crimped at both ends, comprises an outer cylindrical housing 20 in which an overtravel coil spring 21 is coaxially disposed between said outer housing and an inner sleeve member 22. Annular retaining members or washers 23 rest against each end of coil spring 21 for a purpose to be hereinafter disclosed.

Power cylinder device 4 is provided with a piston rod 24 on the end of which a spring pressure assembly 25 is carried. Pressure assembly 25 comprises a tapered coil spring 26 compressed between an upper axially fixed flange 27 and a dish-like spring retainer 28 normally biased by said tapered spring to rest against a lower flange 29 formed on the lower end of a cylindrical central body section 30 of said spring pressure assembly. During crimping operation, housing 20 of overtravel spring assembly 19 to be crimped is placed in position on the crimping devices as shown in broken outline in FIG. 1. With housing 20 in position, pressure is supplied to cylinder device 4, which causes piston rod 24 and spring pressure assembly 25 to be moved downwardly to an extended position. After a certain amount of such downward movement of pressure assembly 25, retainer 28 engages the upper end of housing 20 to thereby stop further downward movement of said retainer. Body portion 30 of pressure assembly 25, however, continues to move downwardly, because the outer diameter of flange 29 is less than the inner diameter of housing 20, until the lower end of said body portion abuts against the upper end of post 12 to stop all downward movement of pressure assembly 25.

Cylinder device 4 and spring pressure assembly 25 have several functions among which are:

(1) to provide a downwardly-acting clamping force on platen 13 for maintaining the proper crimp dimension on the end (to be crimped) of overtravel spring housing 20; (2) a downwardly-acting force, transmitted through tapered spring 26 and retainer 28, on housing 20 for seating it against base 6; and (3) after one end of housing 20 has been crimped and the spring assembly 19 has been turned over on its outer end on the base 6, to compress overtravel spring 21 to a height less than its intended preload height so that said other end of housing 20 may be crimped.

Figure 6:
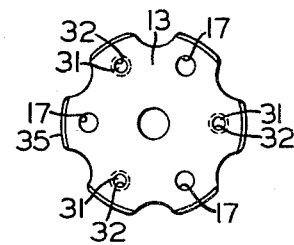
FIGS. 6 and 6A are horizontal and elevational views, respectively, partly in section, of a platen element.
Figure 4A:
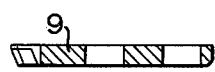
Figure 5A:
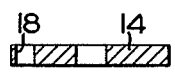
Figure 6A:

Three equiangularly spaced steel balls or ball bearings 31 are retained in respective holes 32 formed in platen 13 (see FIGS. 1 and 6) and are of such diameter as to slightly project above the upper surface of said platen for a purpose to be hereinafter disclosed.

In considering the operation of the crimping apparatus, let it be assumed that the power cylinder 4 and spring pressure assembly 25 are retracted to an upper position, as shown in FIG. 1, out of contact with post 12. The overtravel spring housing 20 to be crimped is placed over post 12, platen 13, and spacer 14 until the lower rim or end of said spring assembly housing rests on base 6. Air cylinder 4 is actuated to extend spring pressure assembly 25 downwardly until it assumes a clamping position against post 12, with said post, platen 13, and spacer 14 all clamped against base 6, and overtravel spring housing 20, as shown in phantom outline in FIG. 1, also secured against said base.

Power chuck 3 is actuated by a conventional air cylinder (not shown) so that the blades 9 all simultaneously shear slits and bend convolutions, against platen 13, in the bottom rim area of overtravel spring housing 20 (see FIG. 7A). Inward radial movement of blades 9 is limited by abutment of respective shoulders 33 of blade holders 8 with the webs 11 of base 6.

The jaws of chuck 3 are then retracted. Air cylinder 4 is deactivated allowing spring assembly 25 to retract. Overtravel spring housing 20 is manually rotated approximately 30° on post 12 until crimped sections 34 (see FIG. 7A) are clear of protruding shear surfaces 35 (see FIGS. 1 and 6) of platen 13. Overtravel spring housing 20, which is now crimped at one end, is lifted off post 12.

With overtravel spring housing 20 removed from post 12, one retaining washer 23 is dropped over post 12 to rest on balls 31 in platen 13. Another retaining washer 23 is installed inside overtravel spring housing 20 to rest against the crimped surfaces at the end previously crimped, whereupon spring 21 and sleeve 22 are inserted in housing 20 to rest against washer 23 previously installed therein. This entire assembly is then inverted and installed over post 12 until overtravel spring 21 comes into contact with initially installed washer 23 resting at the base of post 12.

Once again upper air cylinder 4 is activated so that retainer 28 of spring pressure assembly 25 engages housing 20 of overtravel spring assembly 19 to clamp platen 13 and housing 20 against base 6. As spring pressure assembly 25 continues in its downward movement, washer 23 resting on overtravel spring 21, is engaged by the lower end of body portion 30 of said spring pressure assembly, to thereby compress said overtravel spring. The jaws of power chuck 3 are again actuated to thus crimp the second end of housing 20, in the manner above described, after which the jaws are retracted.

Upper air cylinder 4 is partially retracted sufficiently to release the clamping force on platen 13 but to maintain compression of overtravel spring 21 against lower washer 23 resting on balls 31. At this point, therefore, the clamping force acting on housing 20 is no longer in effect so that it may easily be rotated the necessary 30° to allow the crimped areas to clear the protruding shear surfaces 35 on platen 13. After complete retraction of air cylinder 4, the completed overtravel spring assembly may be removed from the crimping apparatus. With both ends thus crimped, overtravel spring 21 is retained in a compressed state between the washers 23 disposed at opposite ends of housing 20.

Having thus described the invention, what we claim as new and desire to secure by Letters Patent, is:

1. Crimping apparatus for crimping opposite annular ends of a housing member for an overtravel spring assembly for use in a slack adjuster, said crimping apparatus comprising:
   (a) a support frame;
   (b) power chuck means mounted vertically on a lower portion of said support frame and having a plurality of equiangularly spaced, radially movable jaws on which respective crimping blades are removably secured for movement therewith, said blades being operable upon inward radial movement thereof for crimping said housing member at one end;
   (c) a base member concentrically secured to said chuck means;
   (d) a post member concentrically secured to said base member and on which said housing member is removably installed in a crimping position in which a lower end thereof rests against said base member;
   (e) power cylinder means including a piston rod and mounted vertically on an upper portion of said support frame opposite said chuck means and in axial alignment therewith; and
   (f) a spring pressure assembly secured to said piston rod and movable therewith;
   (g) said spring pressure assembly being operable, upon actuation of the power cylinder means, out of a retracted position to an extended position in which the upper annular rim of said housing member is engaged by the spring pressure assembly for securing the housing in said crimping position,
   (h) said power chuck means being operable responsively to actuating pressure for effecting radial inward movement of said jaws and blades.

2. Crimping apparatus, as set forth in claim 1, wherein said spring pressure assembly comprises:
   (a) a central body section rigidly secured at one end to the end of said piston rod in axial alignment therewith;
   (b) respective flanges fixed at each axial end of said body section;
   (c) an annular spring retainer normally occupying a seated position against one of said flanges formed at the lower end of said body portion opposite said one end secured to said piston rod and being axially movable relative to said central body section; and
   (d) a spring member compressibly disposed between said spring retainer and the other of said flanges for applying a downwardly directed force on said retainer member,
   (e) said retainer member being engageable with said upper annular rim of said housing member upon downward movement of the spring pressure assembly for retaining said housing member in its said crimping position, and said central body section being engageable with the top of said post member upon continued downward movement of the spring pressure assembly.

3. Crimping apparatus, as set forth in claim 1, further characterized by a spacer member disposed on said post member between said base member and a platen member, said post member, said platen member and said spacer member all being secured to said power chuck by a stud member, said spacer member being disposed on said post member in an axial position in radial alignment with said crimping blades for determining the axial dimension of resulting crimps.

4. Crimping apparatus, as set forth in claim 1, wherein said housing member is invertible, upon operation of said spring pressure assembly to its said retracted position, and installable on said post member in an inverted crimping position in which the end opposite its said one end may be crimped.

5. Crimping apparatus, as set forth in claim 4, wherein said housing member, when installed on said post member in said inverted crimping position, coaxially carries therein an an overtravel spring, a sleeve member within the overtravel spring member, and a retaining washer adjacent each end of the overtravel spring member, said overtravel spring member being compressed to a preselected height by said spring pressure assembly during crimping operation of the end opposite said one end of the housing member and being retained at said preselected height by the crimps at both ends of the housing member.

6. Crimping apparatus, as set forth in claim 3, wherein said platen member is provided with equiangularly spaced shearing positionally coinciding with and cooperating with said crimping blades for crimping the annular ends of said housing member.

7. Crimping apparatus, as set forth in claim 6, wherein said platen member is provided with a plurality of equiangularly spaced ball bearings having the adjacent retaining washer bearing and rotatable thereon for clearing the crimped area of the housing member of said shearing edges of the platen.

8. Crimping apparatus, as set forth in claim 1, wherein said cutting blades are replacably secured on respective blade holders slidably carried by the base member and bolted to and movable with the chuck jaws for limited radial movement relative to said base member.

* * * * *